May 30, 1961
O. A. KRUEGER
2,986,407
APPARATUS FOR REDUCING THE LOADING ON THE LOAD
SUPPORTING AXLES OF A TRUCK MOUNTED VEHICLE
Filed April 21, 1960
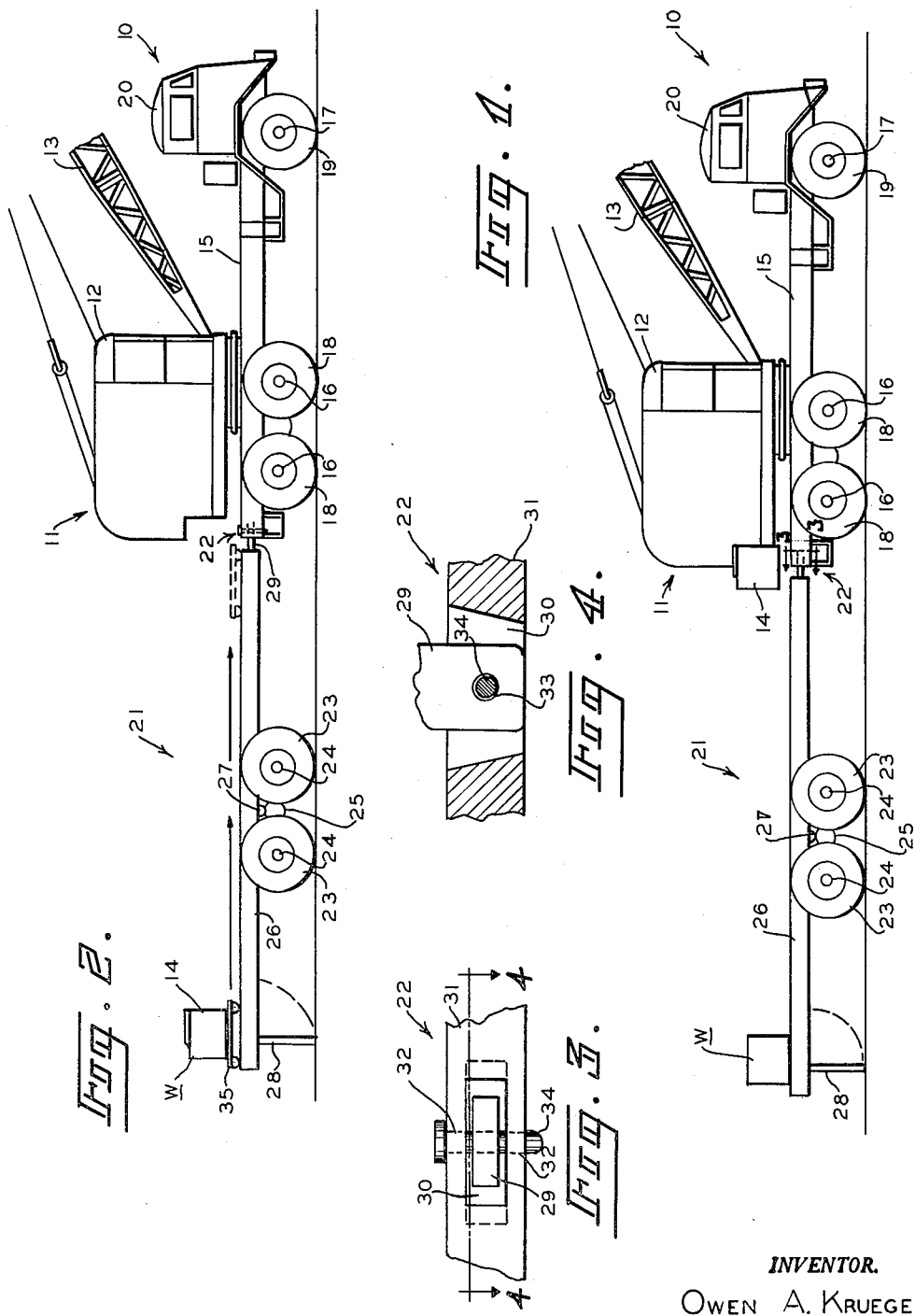
INVENTOR.
Owen A. Krueger
BY
Owen & Owen

United States Patent Office 2,986,407
Patented May 30, 1961

2,986,407

APPARATUS FOR REDUCING THE LOADING ON THE LOAD SUPPORTING AXLES OF A TRUCK MOUNTED VEHICLE

Owen A. Krueger, 5704 Parkside Drive, Monroe, Mich.

Filed Apr. 21, 1960, Ser. No. 23,769

3 Claims. (Cl. 280—405)

This invention relates to an apparatus for reducing the loading on certain of the load supporting axles of heavy truck mounted vehicles such as self-propelled cranes, concrete mixers, and the like.

The axle loading of a truck mounted vehicle such as a crane becomes quite important when the vehicle is moved over highways because various jurisdictions have enacted laws regulating maximum axle loads in order to prevent damage to the highway paving caused by high unit bearing pressures. The axle loading is often checked by portable equipment carried by law enforcement officers, and in the case of toll roads the axle loading is automatically checked before the vehicle is permitted to enter the road.

The provision of additional load carrying axles which mount additional load carrying wheels on the truck bed is undesirable from the standpoint that it not only increases the cost of the equipment, but also the additional axles are not required when the vehicle is stationary and outriggers are used. Problems of distributing the weight between the load carrying axles arise when additional axles are incorporated in the bed of the truck.

Many times it is customary to remove a portion of the equipment from the truck mounted vehicle in order to reduce its total weight and consequently the loading on the axles. For example, the two most common parts to be removed from a load lifting vehicle such as a crane are the boom and the counterweight carried at opposed ends of the upper unit. This is undesirable because it requires not only the use of separate equipment to carry these parts, but also additional manpower and time in the assembly and disassembly operations.

It is therefore the object of the present invention to provide apparatus for redistributing and reducing the loading on certain of the load supporting axles of a truck mounted vehicle when the vehicle is being moved so that each axle of the vehicle is loaded at less than the maximum allowed by the various state and local regulations.

A further object of the invention is to provide an apparatus for reducing the loading on the load supporting axles of a truck mounted self-propelled vehicle which may be used with a plurality of different types and sizes of self-propelled vehicles.

These noted and more specific objects and advantages of the invention will become apparent from the following detailed description of a preferred embodiment and from the drawings wherein like numbers are used throughout to indicate like parts.

Fig. 1 is a diagrammatic side elevational view of a truck mounted vehicle and the load relieving device of the invention attached thereto;

Fig. 2 is a view in elevation of a truck mounted vehicle having attached thereto an embodiment of the invention in which the load relieving device is provided with means for utilizing the counterweight of the vehicle;

Fig. 3 is an enlarged fragmentary view of a connecting hitch between the load relieving device and the truck mounted vehicle taken along the line 3—3 of Fig. 1; and Fig. 4 is a sectional view taken along the line 4—4 of Fig. 3.

Referring now to the drawings, there is shown in Figs. 1 and 2 a truck mounted load lifting vehicle 10 with which the apparatus of the present invention is particularly concerned. This vehicle has an upper unit 11 which includes suitable hoisting machinery (not shown), an operator's cab 12 and boom 13 to which any well-known lifting apparatus may be attached. For example, this vehicle may carry a crane hook, drag line, clam shell, or drop ball. The weight of the load carried by the boom is counterbalanced by means of heavy counterweights 14 removably attached to the opposite side of the upper unit 11.

The upper unit 11 is mounted for swinging movement about a substantially vertical axis of rotation upon the bed 15 of the vehicle 10. The weight of the truck mounted vehicle is carried by a pair of rear load supporting axles 16 and a front axle 17. Because the rear axles 16 are close to the center of gravity of the vehicle and load as a whole, they carry the greater proportion of the weight, while the front axle 17 carries a much lesser portion of the weight. The loading on the rear axles 16 may far exceed the legal or safe limit while the loading on the front axle 17 is well below this limit. Each of the load supporting axles 16 mounts load carrying wheels 18 at the ends thereof, while the front axle 17 mounts a set of steerable guiding wheels 19 which are controlled in the usual manner from the truck cab 20.

According to the present invention, the loading on the load supporting axles 16 of the load lifting vehicle 10 is reduced to permit the vehicle to be moved over soft ground or highways. When the vehicle is to be moved from one work site to another, the load is removed from the boom 13 which is positioned directly over the guiding wheels 19 toward the front of the vehicle 10. Inasmuch as the boom 13 is pointing in a forwardly direction, the portion of the upper unit 11 that carries the counterweight 14 is pointing directly towards the rear of the vehicle 10. To redistribute the total load of the vehicle to reduce the proportionate part carried on the axles 16 and to increase the proportionate part carried on the front axle 17, an upwardly directed force is applied to a portion of the truck bed 15 which extends rearwardly from the load supporting axles 16.

This upwardly directed force is applied by a first class lever having its fulcrum positioned between a weight, which operates as a downward force, and the rear of the vehicle 10. As shown in Figs. 1 and 2, this first class lever is preferably in the form of a load relieving trailer 21 which is positioned rearwardly of the vehicle 10. This trailer is attached to the portion of the bed 15 which extends outwardly from the rear axles 16 and is oppositely disposed from the front axles 17 by means of a force transmitting hitch 22 that will be described later in more detail. As shown most clearly in Fig. 1, a weight W carried by the trailer 21 applies a downward force at one end of the lever thereby producing an upward force at the opposite end which is attached to the bed 15 adjacent the counterweight 14.

The trailer 21 is provided with pneumatic tired wheels 23 which are mounted on each end of a pair of spaced horizontally extending substantially parallel axles 24 journaled in a lower frame 25. These wheels 23 permit the trailer 21 to be moved with the vehicle 10.

A substantially rectangular platform 26 carries the weight member W as shown in Fig. 1 and constitutes the lever arm of the first class lever. In order to provide a fulcrum for the lever arm and mount the platform on the lower frame 25 a horizontally extending supporting beam 27 is positioned between the axles 24 immediately above the lower frame 25. In the preferred form of the invention, the support beam 27 is so positioned that the weight 23 acts at a distance from the fulcrum which is equal to the distance between the fulcrum and the hitch 22. It will be appreciated that the position of the beam 27 relative to the platform 26 may be changed to vary the mechanical advantage of the first class lever by moving the trailer wheel set backwards or forwards in a manner well known in the art or, more simply, by changing the location of the weight W relative to the fulcrum point of the lever.

A suitable hinged support 28 is mounted on the lower side of the platform 26 on the end which carries the weight W, and this member is used to support this weight when the attached trailer 21 and vehicle 10 are in a stationary position. The support 28 is adapted to be swung upwardly beneath the frame 26 as shown by the dotted lines in Figs. 1 and 2.

When the support 28 is swung out of ground contact position, the weight W will cause the platform 26 or lever arm to pivot about the supporting beam 27 or fulcrum. This, in turn, produces an upwardly directed force at the opposite end of the platform 26 at the hitch 22.

In order to transmit the upwardly directed force from the one end of the trailer platform 26 to the vehicle 10 as well as permit the vehicle and trailer to turn corners, the hitch 22 pivotally attaches one to the other. A forwardly extending tongue 29 is rigidly secured to the forward end of the platform 26 and protrudes into a suitable slot 30 in the rearmost horizontally extending cross frame member 31 of the bed 15. A pair of aligned apertures 32 are drilled in the cross member 31 at opposite sides of the slot 30 and a corresponding aperture 33 is formed in the tongue 29. To pivotally attach the load relieving trailer 21 to the vehicle 10, the tongue 29 is inserted in the slot 30 until the aperture 33 is in alignment with the apertures 32. This position is maintained by means of a draw pin 34 inserted through the cross member 31 and the tongue 29. The upwardly directed force of the hitch end of the platform 26 resulting from the weight W is transmitted through the mutually contacting surfaces of the tongue 29 to the cross member 31. Adequate clearance is provided in the slot 30 along each side of the tongue 29 as shown in Fig. 4 to allow the trailer 21 to be turned relative to the vehicle 10.

As an illustration of the practice of the invention, the axle loading on a truck mounted crane such as the one shown in Fig. 1 which has a spacing between the dual rear axles 16 of 4.0 feet and a spacing between the forward axle 16 and the front axle 17 of 16.66 feet works out approximately as follows: If the total weight of the crane and vehicle is 54,000 pounds, the load supporting axles 16 each carry 22,000 pounds while the front axle 17 carries only 10,000 pounds. If a load relieving trailer 22.0 feet in length and weighing 6,000 pounds net is attached to the rearmost portion of the vehicle these axle loadings may be altered considerably. If the platform 26 of the trailer may be considered as a lever supported on a beam or fulcrum 27 located 10 feet from the hitch 12 and supported by a pair of axles 24 having a spacing of 4.0 feet, a 12,000 pound weight having its center of mass 2 feet from the rear of the platform 26 may constitute the load-relieving force.

After the trailer 21 with the weight W positioned thereon is attached to the vehicle 10 each of the axles 24 of the trailer will be found to have a 15,000 pound loading while the loading on each of the rear axles 16 of the vehicle 10 has been decreased from 22,000 pounds to 14,500 pounds and the front axle loading will have increased from 10,000 pounds to 13,000 pounds. Thus the crane with the load relieving trailer attached could be moved legally over a highway having a maximum allowable axle loading of only 15,000 pounds.

The second embodiment of the invention is shown in Fig. 2 and is substantially the same as Fig. 1 with the exception that the counterweight 14 of the crane is used as the weight W. A suitable wheeled dolly 35 may be provided for carrying the counterweight 14. In operation the dolly 35 is moved to the forward end of the trailer 21 as shown by the dotted lines in Fig. 2 after it is attached to the bed 15, and the counterweight 14 may then be removed and placed on the dolly 35 which is then moved rearwardly to the position shown in Fig. 2.

If the axle loading on a crane weighing 70,000 pounds, including a 12,000 pound removable counterweight and having the same axle spacing as the above mentioned crane, is such that each of the load supporting axles 16 has a loading of 28,000 pounds while the front axle 17 has a loading of 14,000 pounds, these loadings can be altered by utilizing the apparatus shown in Fig. 2. The same load redistributing trailer 21 is attached to this crane and the 12,000 pound counterweight is disconnected and transferred to the dolly 35 which, in turn, is moved to the opposite end of the trailer. The loading of each of the axles 16 and 24 then becomes only 15,000 pounds while the loading on the front axle 17 is increased to 16,000 pounds. Such a heavy vehicle could then be legally transported over any road having maximum axle loading limits in excess of 16,000 pounds.

While each of the above examples has been described in connection with a truck mounted crane, it will be appreciated that the load relieving trailer of the invention will work equally well when attached to other types of vehicles, such as concrete mixers which are characterized by very heavy loading on some axles and light loading on others. Such a means to redistribute the load to give approximately equal loading to all axles becomes especially useful in the spring when axle loadings are even more limited than during the remainder of the year.

I claim:

1. In combination with a truck mounted vehicle having unequally loaded front and rear axles, a load relieving trailer for reducing the loading on said rear axle and increasing the loading on said front axle, means for connecting one end of said trailer to a portion of said vehicle on the opposite side of said rear axles from said front axle, said means acting to apply an upwardly directed force at the point of connection, and a weight carried by said trailer at an end oppositely disposed from said connecting means.

2. In combination with a truck mounted vehicle having its center of gravity nearer its rear axles than its front axle and a greater loading on the rear axles than on the front axle, a load relieving trailer having centrally disposed wheels carried by a frame, means for connecting a portion of said trailer removed from said frame to a section of said vehicle removed from said front axle, said connecting means including means for transmitting an upwardly directed force from said portion of said trailer to said section of said vehicle, and a weight carried by another portion of said trailer on the opposite side of said frame from said connecting means whereby said trailer tends to rotate about said frame to apply an upwardly directed force to said connecting means to reduce the loading on said rear vehicle axles and to increase the loading on said front axle.

3. In combination with a truck mounted vehicle having unequally loaded front and rear axles and a removable counterweight positioned means to said rear axles than to said front axles, a load relieving trailer for reducing the loading on said rear axles by applying an upwardly directed force to a portion of said vehicle located nearer to said rear axles than to said front axles, means for connecting one end of said trailer to said vehicle adjacent said counterweight, and means for supporting said counterweight on said trailer when said trailer is connected to said vehicle and said counterweight is removed from said vehicle, said supporting means including means for moving said counterweight from one end of said trailer to another.

References Cited in the file of this patent

UNITED STATES PATENTS

| | | |
|---|---|---|
| 2,238,002 | Pointer | Apr. 8, 1941 |
| 2,511,692 | Brown | June 13, 1950 |
| 2,831,731 | Bennett et al. | Apr. 22, 1958 |
| 2,916,172 | Locke | Dec. 8, 1959 |

UNITED STATES PATENT OFFICE
CERTIFICATE OF CORRECTION

Patent No. 2,986,407                          May 30, 1961

Owen A. Krueger

It is hereby certified that error appears in the above numbered patent requiring correction and that the said Letters Patent should read as corrected below.

Column 4, line 56, for "means" read -- nearer --.

Signed and sealed this 31st day of October 1961.

(SEAL)
Attest:

ERNEST W. SWIDER
Attesting Officer

DAVID L. LADD
Commissioner of Patents
USCOMM-DC